US006778374B2

(12) United States Patent
Berlovan et al.

(10) Patent No.: US 6,778,374 B2
(45) Date of Patent: Aug. 17, 2004

(54) REINFORCED ARRESTER HOUSING

(75) Inventors: Viorel Berlovan, Medina, OH (US); Bryan R. Nelson, Westfield Center, OH (US)

(73) Assignee: Hubbell Incorporated, Orange, CT (US)

( * ) Notice: Subject to any disclaimer, the term of this patent is extended or adjusted under 35 U.S.C. 154(b) by 406 days.

(21) Appl. No.: 10/035,336

(22) Filed: Jan. 4, 2002

(65) Prior Publication Data

US 2003/0128492 A1 Jul. 10, 2003

(51) Int. Cl.[7] .................................................. H02H 9/00
(52) U.S. Cl. ...................... 361/117; 361/91.1; 361/111; 361/118; 361/127
(58) Field of Search .......................... 361/58, 56, 91.1, 361/111, 117, 118, 127

(56) References Cited

U.S. PATENT DOCUMENTS 4,352,140 A 9/1982 Axelsson .................... 361/127
4,851,955 A 7/1989 Doone ........................ 361/117
4,962,440 A 10/1990 Johnnerfelt et al. ........ 361/126
4,989,115 A 1/1991 Bourdages .................. 361/126
5,210,676 A * 5/1993 Mashikian .................. 361/117
5,363,266 A 11/1994 Wiseman .................... 361/127
5,402,100 A 3/1995 Urbanek ..................... 361/127
5,625,523 A 4/1997 Nedriga ...................... 361/127
5,652,690 A * 7/1997 Mansfield et al. .......... 361/127
6,185,813 B1 2/2001 Donnola ..................... 361/117

* cited by examiner

*Primary Examiner*—Stephen W. Jackson
(74) *Attorney, Agent, or Firm*—Mark S. Bicks; Alfred N. Goodman

(57) ABSTRACT

An arrester includes a housing having an inner bore, and a substantially cylindrical varistor body is received in the inner bore of the housing. The varistor body is formed of at least one varistor element having a lateral outer surface and a length defined between first and second ends of the varistor body, and a first mating element extending outwardly from the outer surface and along substantially the entire length of the body. A substantially rigid first support member is received in the inner bore and is disposed on the outer surface of the body. The first support member has a first mating surface that corresponds to and engages the first mating element of the body, thereby coupling the body and the first support member.

22 Claims, 2 Drawing Sheets

REINFORCED ARRESTER HOUSING

FIELD OF THE INVENTION

The present invention relates to a surge arrester having a reinforced housing. More specifically, the present invention relates to an arrester housing that includes substantially rigid support members that surround and support varistor elements of the arrester and provide mechanical strength to the arrester housing.

BACKGROUND OF THE INVENTION

A surge arrester is a protective device for power distribution systems. In particular, a surge arrester directs any over current in the system to ground. Conventional surge arresters include a current path to ground through resistance or varistor elements that dissipate the surge in current without damage to the utility line equipment.

Conventional surge arresters have an outer housing made of an insulative material such as porcelain or a polymer resin, and encloses a compressed stacked of varistor elements, such as metal oxide varistor (MOV) blocks. The varistor elements are typically wrapped by a weave casing or are surrounded by structural members. The varistor elements are electrically connected between the line current of the system and ground. The structural members surrounding varistor elements of a conventional arrester are usually not attached to the varistor elements and therefore must be attached to another part of the arrester housing, such as the end caps or end terminals. Assembly time and difficulty are increased due to the additional steps in attaching the structural members to the arrester housing. Moreover, separate fasteners are required to attach the structural members to the arrester housing.

During a catastrophic failure, an electrical arc is formed within the arrester housing triggering the generation of gases by the varistor elements and typically resulting in an explosion of the arrester due to the pressure of the internal gases. The weave casing or structural members of conventional arresters typically fail to control the internal gases and the exploding varistor elements, and the bursting arrester tends to shatter and throw parts resulting in property damage.

Examples of conventional surge arresters include U.S. Pat. No. 4,352,140 to Axelsson et al; U.S. Pat. No. 4,851,955 to Doone et al.; U.S. Pat. No. 4,989,115 to Bourdages et al.; U.S. Pat. No. 5,363,266 to Wiseman et al.; U.S. Pat. No. 5,402,100 to Urbanek et al.; and U.S. Pat. No. 6,185,813 to Donnola.

SUMMARY OF THE INVENTION

Accordingly, an object of the present invention is to provide a surge arrester with a housing that substantially prevents explosion of the arrester housing during a catastrophic failure.

Another object of the invention is to provide a surge arrester with a housing that includes substantially rigid support members located within the housing providing reinforcement thereto.

Yet another object of the invention is to provide a surge arrester with support members that both reinforce the arrester housing and support the varistor elements of the arrester.

Still another object of the invention is to provide a surge arrester with a reinforced housing that is easily assembled without the need for additional fasteners.

The foregoing objects are basically attained by an arrester including a housing having an inner bore, and a substantially cylindrical varistor body received in the inner bore of the housing. The varistor body is formed of at least one varistor element having a lateral outer surface and a length defined between first and second ends of the varistor body, and a first mating element extending outwardly from the outer surface and along substantially the entire length of said body. A substantially rigid first support member is received in the inner bore and is disposed on the outer surface of the body. The first support member has a first mating surface that corresponds to and engages the first mating element of the body, thereby coupling the body and the first support member.

The foregoing objects are also attained by a method of making an arrester by mating a plurality of substantially rigid support members with a substantially cylindrical mold core so that first mating elements of the mold core engage corresponding second mating elements, respectively, of the support members. The method also includes molding a housing around the support members and the mold core and removing the mold core from the housing, thereby forming an inner bore of the housing. The method additionally includes inserting a substantially cylindrical varistor body formed of a plurality of varistor elements into the inner bore of housing so that third mating elements of the body engage the second mating elements, respectively.

By fashioning the arrester in this manner, the arrester housing is reinforced thereby preventing shattering of the arrester during failure, and the assembly of the arrester is simplified.

Other objects, advantages and salient features of the invention will become apparent from the following detailed description, which, taken in conjunction with annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Referring to FIGS. 1–5, an arrester 10 in accordance with an embodiment of the present invention generally includes a housing 12 enclosing a plurality of varistor elements 14 and first, second, and third support members 16, 18, 20 which reinforce housing 12 and support varistor elements 14.

Figure 1:
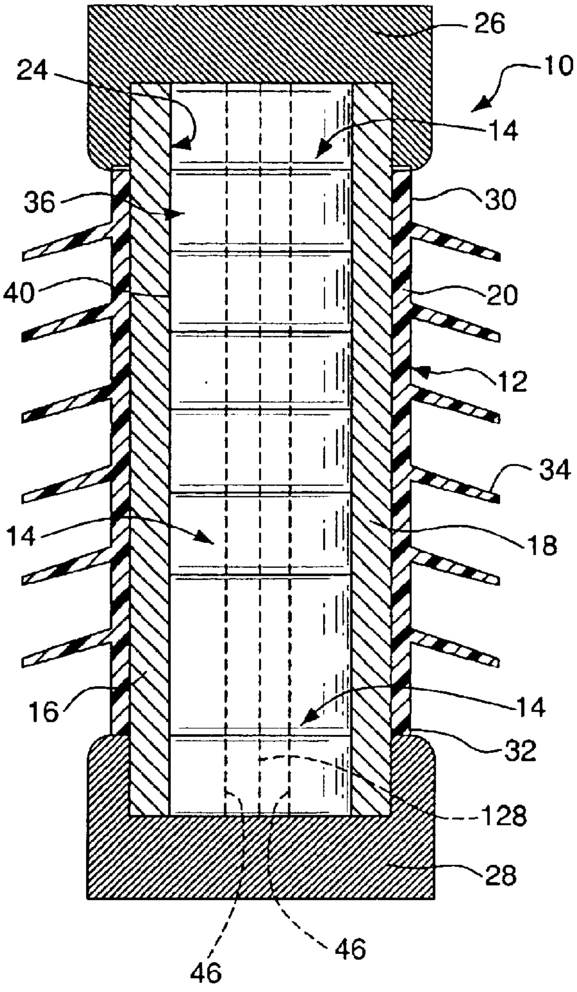
FIG. 1 is a side elevational view in section of an arrester in accordance with an embodiment of the present invention, showing support members between varistor elements and the arrester housing.
Figure 2:
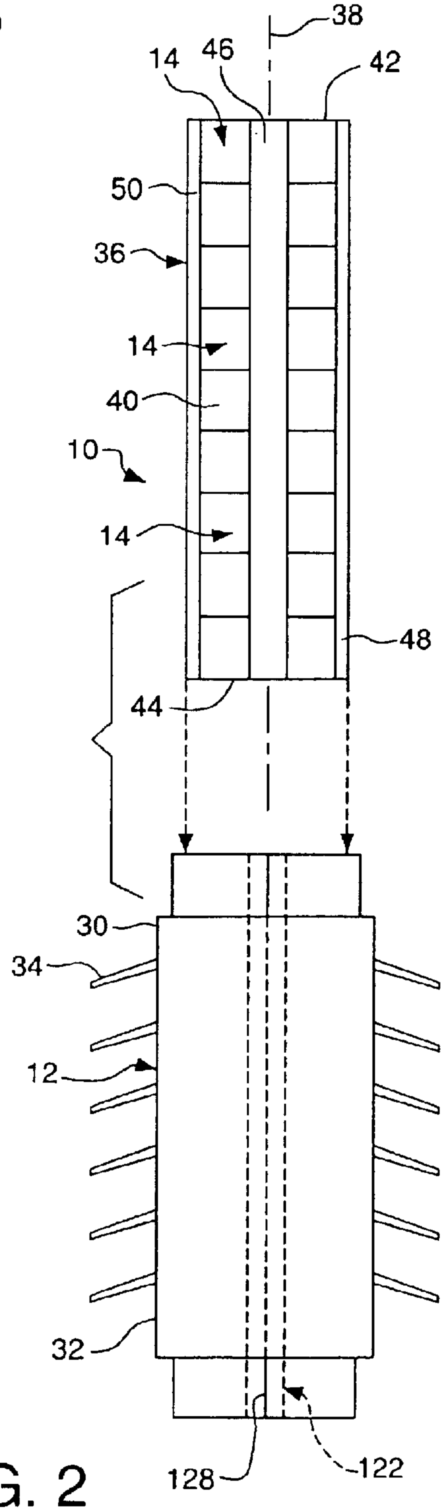
FIG. 2 is an exploded, side elevational view of the arrester illustrated in FIG. 1, showing the varistor elements being inserted into the arrester housing.

As seen in FIGS. 1–2, housing 12 includes a substantially cylindrical insulative wall 22 having an inner bore 24 for receiving varistor elements 14, as is well known in the art. First and second end caps 26 and 28 are located at opposite ends 30 and 32 of housing wall 22 for enclosing varistor elements 14. Varistor elements 14 are stacked and compressed between end caps 26 and 28 which are electrically connected between line current and ground, thereby forming an electrical path through varistor elements 14. Housing 12 can include protective weather sheds 34 extending outwardly therefrom, as is well known in the art, however, whether sheds are not required.

Varistor elements 14 are conventional non-linear elements, such as MOV blocks or the like. Although a plurality of varistor elements 14 are shown, one large varistor element can be used instead. As best seen in FIGS. 1 and 2, varistor elements 14 are stacked one on top of the other to form a generally cylindrical body 36 that defines a central longitudinal axis 38. Varistor body 36 includes an outer lateral surface 40 and opposite first and second end surfaces 42 and 44. The length of varistor body 36 is defined between first and second end surfaces 42 and 44.

Figure 4:
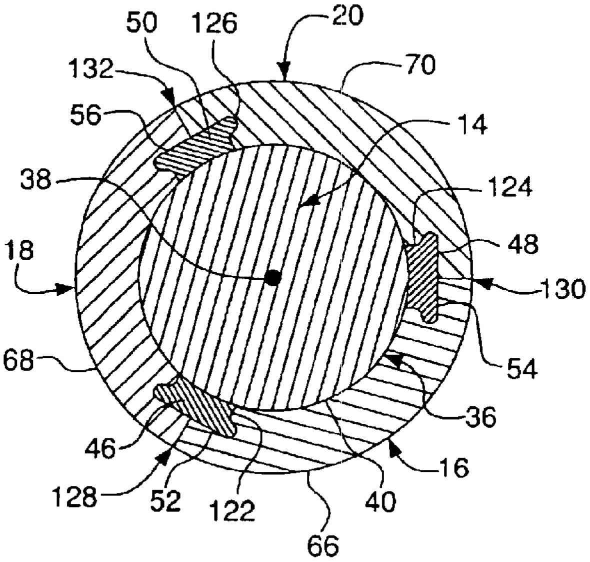
FIG. 4 is a top plan view of the support members and varistor elements in section taken along line 4—4 of FIG. 3.
Figure 5:
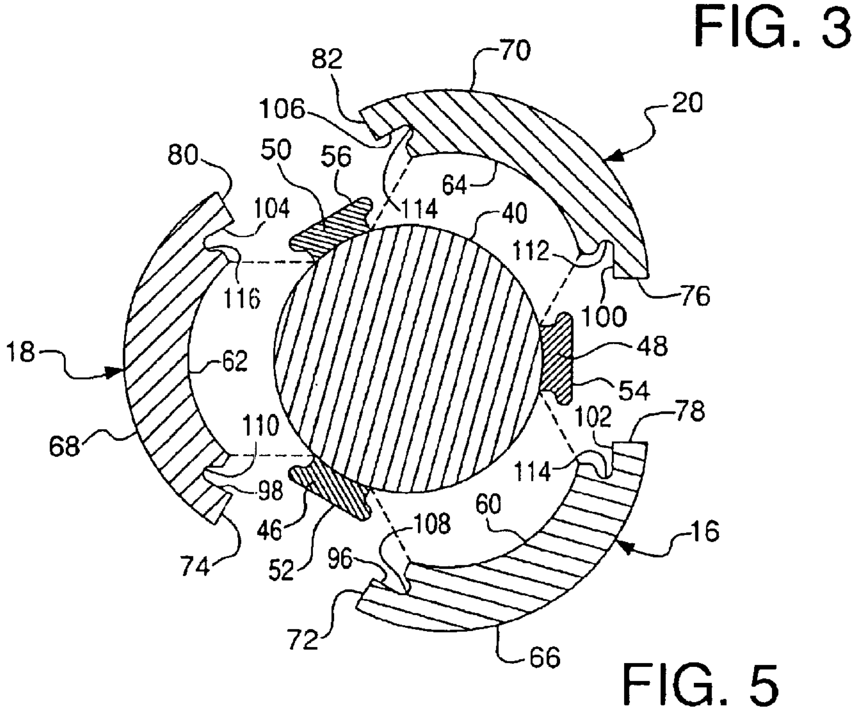
FIG. 5 is an exploded, top plan view in section of the support members and varistor elements illustrated in FIG. 4.

Extending radially outwardly from varistor body outer lateral surface 40 are first, second, and third mating or tongue elements 46, 48, and 50. Tongue elements 46, 48, and 50 are evenly and circumferentially spaced around varistor body outer lateral surface 40, as best seen in FIGS. 4 and 5, and have a generally key shape in transverse cross section for interlocking with support members 16, 18, 20. Preferably, each tongue element 46, 48, and 50 extends substantially the entire length of varistor body 36. However, each tongue element 46, 48, and 50 can extend for only a portion of the length of varistor body 36. Also, each tongue element 46, 48, and 50 is preferably a single continuous or unitary element, but each element can be formed of a plurality of axially spaced elements. Each tongue element 46, 48, and 50 includes an outer mating surface 52, 54, and 56, respectively, for engaging first, second, and third support members 16, 18, and 20. Tongue elements 46, 48, and 50 can be either be unitary with varistor body 36 or separately formed and integrally attached to varistor body 36. Elements 46, 48, and 50 are preferably made of a rigid material, such as metal.

As seen in FIGS. 1–5, first, second, and third separate support members 16, 18, and 20 are disposed in inner bore 24 of housing 12 and surround varistor body 36 so that support members 16, 18, and 20 are each between housing wall 22 and varistor body 36. Preferably, support members 16, 18, and 20 are made of a substantially rigid material, such as metal, to provide reinforcement and rigidity to housing 12. Support members 16, 18, and 20 are curved with respect to central longitudinal axis 38 of varistor body 36 to generally conform to the curvature of outer lateral surface 40 of varistor body 36. The support members 16, 18, and 20 cover generally the entire outer lateral surface 40 of varistor body 36. Although three support members are preferable, less than three support members can be employed.

Support members 16, 18, and 20 are substantially the same and have generally concave inner surfaces 60, 62, and 64, respectively, and generally concave outer surfaces 66, 68, and 70, respectively, forming arc shaped members. Each support member 16, 18, and 20 includes a first side wall 72, 74, or 76, respectively, an opposite second side wall 78, 80, or 82, respectively. The side walls of each member 16, 18, and 20 extend between the first ends 84, 86, and 88, respectively, and the opposite second ends 90, 92, and 94, respectively. The lengths of each member 16, 18, 20 are the same and each length is defined between their respective ends. For example, the length of member 16 is defined between first end 84 and second end 90.

Figure 3:
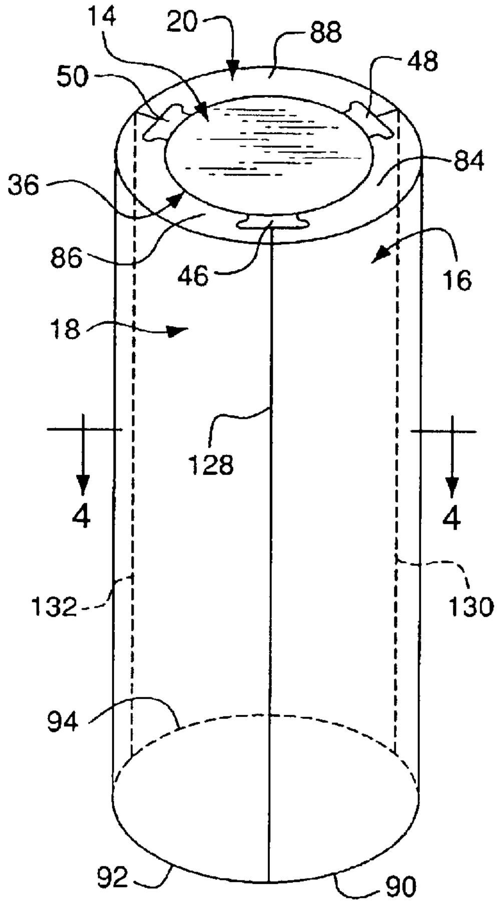
FIG. 3 is a perspective view of the support members and the varistor elements of FIG. 1, showing the support members surrounding the varistor elements.

As best seen in FIGS. 3–5, each support member 16, 18, and 20 includes a first mating surface 96, 98, and 100, respectively, and an opposite second mating surface 102, 104, and 106, respectively. Preferably, first mating surfaces 96, 98, and 100 define first grooves 108, 110, and 112, respectively, and second grooves 114, 116, and 118, as best seen in FIG. 5. Each first groove 108, 110, and 112 extends along one first side wall 72, 74, and 76, respectively, of support members 16, 18, and 20. Likewise, each second groove 114, 116, and 118 extends along a second side wall 78, 80, and 82, respectively, of support members 16, 18, and 20. The first and second grooves of support members 16, 18, and 20 correspond to and conform to the shape of tongue elements 46, 50, and 52 of varistor body 36. For example, first groove 108 of support member 16 corresponds to a part of outer surface 52 of first tongue element 46 and second groove 114 of support member 16 corresponds to a part of outer surface 54 of second tongue element 48. Likewise, first groove 110 of support member 18 corresponds to a part of outer surface 52 of first tongue element 46 and second groove 116 of support member 18 corresponds to a part of outer surface 56 of third tongue element 50. Similarly, first groove 112 of support member 20 corresponds to a part of outer surface 54 of second tongue element 48 and second groove 118 of support member 20 corresponds to a part of outer surface 56 of third tongue element 50. Preferably, first grooves 108, 110, and 112 and second grooves 114, 116, and 118 are each continuous and extend the length of their respective support members 16, 18, and 20. However, each first groove 108, 110, and 112 and each second groove 114, 116, and 118 can be shorter than the length of their respective support members 16, 18, 20 and can each be formed as separate spaced grooves.

First, second, and third support members 16, 18, and 20 are placed adjacent one another and around varistor body 36, as best seen in FIG. 4, forming slots therebetween. Specifically, a first slot 122 is formed between first mating surface 96 of first support member 16 and first mating surface 98 of second support member 18. Similarly, a second slot 124 is formed between second mating surface 102 of first support member 16 and first mating surface 100 of third support member 20. Likewise, a third slot 126 is formed between second mating surface 104 of second support member 18 and second mating surface 106 of third support member 20. First, second, and third slots 122, 124, and 126 engage first, second, and third tongue elements 46, 48, and 50, respectively, of varistor body 36, as seen in FIG. 5. The shape of slots 122, 124, and 126 and their corresponding tongue elements 46, 48, and 50, are adapted to interlock support members 16, 18, and 20 with varistor body 36 in a direction transverse to the longitudinal axis 38 of varistor body 36.

Between the sides of first, second, and third support members 16, 18, and 20, are vents 128, 130, and 132, as best seen in FIGS. 3–5. Preferably, the sides of support members 16, 18, and 20 abut one another without creating a seal therebetween, thereby allow gas to escape therethrough. However, the sides of support members 16, 18, and 20 can also be slightly spaced from one another. Vents 128, 130, and 132, allow internal gases of varistor body 36, typically generated during a fault, to vent or escape through support members 16, 18, and 20 in a controlled manner. In particular, first vent 128 is formed between first side wall 72 of first support member 16 and first side wall 74 of second support member 18. Second vent 130 is formed between second side wall 78 of first support member 16 and first side wall 76 of third support member 20. Third vent 132 is formed between second side wall 80 and second support member 18 and second side wall 82 of third support member 20.

Assembly

Referring to FIGS. 1–5, arrester 10 is assembled generally by molding housing 12 around support members 16, 18, and 20 and then mating varistor body 36 with support members 16, 18, and 20. More specifically, each of first, second, and third support members 16, 18, and 20 are placed around a mold core (not shown). The mold core has substantially the same cylindrical shape as varistor body 36 and first, second, and third mating elements of the mold core are substantially the same as tongue elements 46, 48, and 50 of varistor 36.

Support members 16, 18, and 20 are then slidably mounted onto the outer surface of the mold core so that the support members are side by side and surround the mold core. In this position, the first, second, and third mating elements of the mold core are received in first, second, and third slots 122, 124, and 126, respectively, of support members 16, 18, and 20. Once support members 16, 18, and 20 are mounted onto the mold core, housing 12 is molded around support members 16, 18, and 20 and the mold core securing support members 16, 18, and 20 within housing 12. The mold core is then removed exposing inner bore 24 of housing 12.

Varistor body 36 is then slidably inserted into inner bore 24 inside of support members 16, 18, and 20, as seen in FIGS. 1 and 2, so that tongue elements 46, 48, and 50 of varistor body 36 are received in first, second, and third slots 122, 124, and 126, respectively, between support members 16, 18, and 20. Varistor body 36 and support members 16, 18, and 20 form a generally tight fit therebetween and are interlocked in a plane transverse to axis 38 by tongue elements 46, 48, and 50 and slots 122, 124, and 126.

As seen in FIGS. 1 and 2 support members 16, 18, and 20 and varistor body 36 are generally the same in length and longer than housing 12 to support first and second end caps 26 and 28. Preferably, end caps 26 and 28 are crimped onto the first and second end surfaces 42 and 44 of varistor body 36 and onto the first ends 84, 86, and 88 and second ends 90, 92, and 94. Varistor elements 14 are compressed between end caps 26 and 28 in any conventional manner, such as Belleville springs (not shown) being placed between varistor body end surfaces 42 and 44, respectively, and end caps 26 and 28, respectively.

While a particular embodiment has been chosen to illustrate the invention, it will be understood by those skilled in the art that various changes and modifications can be made therein without departing from the scope of the invention as defined in the appended claims.

What is claimed is:

1. An arrester, comprising:

a housing having an inner bore;

a substantially cylindrical varistor body received in said inner bore of said housing, said varistor body is formed of at least one varistor element having a lateral outer surface and a length defined between first and second ends of said varistor body, and a first mating element extending outwardly from said outer surface and along substantially the entire length of said body;

a substantially rigid first support member received in said inner bore and disposed on said outer surface of said body, said first support member having a first mating surface corresponding to and engaging said first mating element of said body, thereby coupling said body and said first support member.

2. An arrester according to claim 1, wherein a substantially rigid second support member is disposed on said outer surface of said varistor body and has a first mating surface that corresponds to and engages said first mating element of said varistor body.

3. An arrester according to claim 2, wherein a slot is defined between said first mating surfaces of said first and second support members, respectively, said slot receives said first mating element of said varistor body.

4. An arrester according to claim 2, wherein said first and second support members cover substantially entirely said outer surface of said varistor body.

5. An arrester according to claim 2, wherein a second mating element extends from said outer surface of said varistor body; and said first support member has a second mating surface opposite said first mating surface that corresponds to and engages said second mating element.

6. An arrester according to claim 5, wherein a substantially rigid third support member is disposed on said outer surface of said varistor body and has a first mating surface that corresponds to and engages said second mating element of said varistor body.

7. An arrester according to claim 6, wherein a slot is defined between said second mating surface of said first support member and said first mating surface of said third support member, said slot receives said second mating element of said varistor body.

8. An arrester according to claim 6, wherein each of said first, second, and third support members is curved with respect to a central longitudinal axis of said varistor body to conform to the shape of said varistor body.

9. An arrester according to claim 6, wherein each of said first, second, and third support members has a length substantially equal to said length of said varistor body.

10. An arrester according to claim 6, wherein said first, second, and third support members cover substantially entirely said outer surface of said varistor body.

11. An arrester according to claim 6, wherein a first vent is located between said first and second support members;

a second vent is located between said first and third support members; and a third vent is located between said second and third support members, whereby said first, second, and third vents allow venting of internal gases of said varistor element during fault conditions.

12. An arrester according to claim 6, wherein a third mating element extends from said outer surface of said varistor body;

said second support element includes a second mating surface opposite said first mating surface of said second support element that corresponds to and engages said third mating element of said varistor body.

13. An arrester according to claim 12, wherein said third support element includes a second mating surface opposite said first mating surface of said third support element that corresponds to and engages said third mating element of said varistor body.

14. An arrester according to claim 13, wherein a slot is defined between said second mating surfaces of said second and third support members, respectively, said slot receives said second support member.

15. An arrester according to claim 1, wherein a second mating element extends from said outer surface of said varistor body; and said first support member has a second mating surface opposite said first mating surface that corresponds to and engages said second mating element.

16. An arrester, comprising:

a housing having an inner bore;

a substantially cylindrical varistor body received in said inner bore of said housing, said body is formed of at least one varistor element having an outer surface, a length defined between first and second ends of said varistor body, a longitudinal axis, and first, second, and third mating elements extending radially outwardly from said outer surface and along substantially the entire length of said varistor body;

substantially rigid first, second, and third support members received in said inner bore and disposed on said outer surface of said varistor body, and each of said first, second, and third support members having a length substantially equal to said length of said varistor body;

a first slot defined between said first and second support members, and said first slot receiving said first mating element of said varistor body;

a second slot defined between said first and third support members, and said second slot receiving said second mating element of said varistor body; and a third slot defined between said second and third support members, and said third slot receiving said third mating element of said varistor body.

17. An arrester according to claim 16, wherein each of said first, second, and third slots provides a vent for internal gases of said varistor element generated during fault conditions.

18. An arrester according to claim 16, wherein each of said first, second, and third support members are curved about said longitudinal axis of said varistor body to conform to the shape thereof.

19. An arrester according to claim 18, wherein said first, second, and third support members cover substantially the entire outer surface of said varistor body.

20. An arrester according to claim 16, wherein each of said first, second, and third support members, respectively, includes opposite first and second sides;

said first side of said first support member is adjacent said first side of said second support member with said first slot being defined therebetween;

said second side of said first support member is adjacent said first side of said third support member with said second slot being defined therebetween; and said second sides of each of said second and third support members, respectively, are adjacent to one another with said third slot being defined therebetween.

21. A method of making an arrester, comprising the steps of:

mating a plurality of substantially rigid support members with a substantially cylindrical mold core so that first mating elements of the mold core engage corresponding second mating elements, respectively, of the support members;

molding a housing around the support members and the mold core;

removing the mold core from the housing, thereby forming an inner bore of the housing; and inserting a substantially cylindrical varistor body formed of a plurality of varistor elements into the inner bore of housing so that third mating elements of the body engage the second mating elements, respectively.

22. A method according to claim 21, wherein the first mating elements of the mold core and third mating elements of the varistor body are-substantially the same; and the mold core and the varistor body are substantially the same size.

* * * * *